United States Patent [19]
Petersen et al.

[11] Patent Number: 4,955,444
[45] Date of Patent: Sep. 11, 1990

[54] HYDROSTATIC STEERING DEVICE

[75] Inventors: Jens K. Petersen; Ole V. Sorensen, both of Nordborg, Denmark

[73] Assignee: Danfoss A/S, Nordborg, Denmark

[21] Appl. No.: 335,957

[22] Filed: Apr. 10, 1989

[30] Foreign Application Priority Data

Apr. 29, 1988 [DE] Fed. Rep. of Germany ....... 3814508

[51] Int. Cl.⁵ .............................................. B62D 5/08
[52] U.S. Cl. ..................................... 180/132; 60/384; 180/154
[58] Field of Search .................. 180/132, 154; 60/384, 60/385, 420, 422, 427

[56] References Cited

U.S. PATENT DOCUMENTS

| | | | |
|---|---|---|---|
| 4,043,419 | 8/1977 | Larson et al. | 180/132 |
| 4,470,260 | 9/1984 | Miller et al. | 180/132 |
| 4,620,416 | 11/1986 | Yip et al. | 60/384 |

FOREIGN PATENT DOCUMENTS 0090129  5/1983  European Pat. Off. ............. 180/132

Primary Examiner—Charles A. Marmor
Assistant Examiner—Victor E. Johnson
Attorney, Agent, or Firm—Wayne B. Easton; Clayton R. Johnson

[57] ABSTRACT

In order to prevent kick-back at the steering element that controls a fluid steering motor, there is provided hydrostatic steering apparatus that includes a control device connected between a priority valve and the steering motor. A load pressure conduit connects an outlet of the priority valve to a junction of the control device. The priority valve includes a tapping at which there is provided fluid pressure for moving priority valve slide, two pressure distributing throttles being connected to the tapping. A check valve that opens toward the junction is provided in the load pressure conduit between one of the distributing valves and the junction. Another check valve that opens toward the junction is fluidly connected in series with a control device supply throttle between the junction and the priority valve outlet, the supply throttle and junction being in a fluid line that supplies pressurized fluid to the steering motor.

7 Claims, 2 Drawing Sheets

HYDROSTATIC STEERING DEVICE

The invention relates to a hydrostatic steering device of which the control device can be fed with pressure fluid from a pump by way of a priority valve, comprises a steering element such as a hand wheel as well as a flow meter and, in response to actuation thereof, controls the flow of pressure fluid to a steering motor, wherein a load pressure conduit leads from the outlet of the priority valve on the side of the control device to a junction in the control device that is connectable by way of a first supply throttle and a first check-valve to the supply connection, by way of a second supply throttle to the meter and by way of a withdrawal nozzle open in the neutral position to the container connection, and comprises two pressure distributing throttles and a tapping therebetween from which a dynamic load pressure is derived to operate the priority valve.

Such a hydrostatic steering device with dynamic load-dependant control is known from US-PS 46 20 416. In contrast with a static load-dependant control, a flow through the load pressure conduit is present during each operating condition, said flow passing to the steering motor by way of the meter upon a steering operation and to the container by way of the withdrawal nozzle in the vicinity of the neutral position. The result of this flow is that the priority valve not only opens during steering but is also slightly open in the neutral position because a small amount of pressure medium flows from the pump by way of the outlet of the priority valve on the side of the control device and by way of the load pressure conduit. For this reason, such a steering device operates more rapidly and no problems arise when the oil in the supply conduits or in the load pressure conduit is cold. In operation, it has been found that impacts occasionally occur at the steering element (kick-back) This has proved very uncomfortable for the operator.

The invention is based on the problem of providing a hydrostatic steering device of the aforementioned kind in which such kick-backs are substantially avoided at the steering element.

This problem is solved according to the invention in that a second check-valve opening towards the junction is provided in the load pressure conduit between the tappIng and the junction.

It has been found that the kick-backs at the steering element occur because, under unfavourable pressure conditions, there is a return flow of pressure fluid through the meter and further through the load pressure conduit against its normal direction of flow. This return flow operates the meter which, in turn, is coupled by way of neutral position springs to the steering element and this leads to the undesirable kick-back. Such unfavourable pressure conditions occur when an excess pressure arises on the side of the steering motor after completion of the operation, for example when the steering motor is loaded from the outside, particularly when the hoses leading to the steering motor have a certain amount of elasticity and therefore behave like a pressure accumulator. Upon renewed operation of the steering device, the excess pressure is relieved by way of the load pressure conduit. Another case of undesirable pressure conditions occurs when the steering motor has been displaced up to the abutment and the priority valve simultaneously also feeds the other consumer. This is because if this consumer is switched off, i.e. the associated outlet of the priority valve is connected to the container, the pump pressure will drop rapidly. This leads to a corresponding pressure drop at the connection of the priority valve on the side of the control device until the priority valve has appropriately throttled the consumer path. Since the second check-valve blocks the load pressure conduit against a return flow, the kick-back at the steering element is avoided.

In the known steering device, an over-pressure valve is provided in a relief conduit branching off from the load pressure conduit to the container. This over-pressure valve limits the load pressure and hence the pressure to be supplied to the control device. Upon using such an over-pressure valve, it is part of the invention to ensure that the second check-valve is disposed between the branching off point and the junction As a result, no return flow will take place through the load pressure conduit when, upon renewed steering, a higher pressure exists in the steering motor than the value of the setting pressure of the over-pressure valve. There will therefore likewise be no kick-back at the steering element under these conditions.

It is particularly favourable if the branching off point is disposed between the pressure distributing throttles and the junction. This provides a large degree of freedom with regard to installing the over-pressure valve. In particular, it can be accommodated independently of the priority valve.

In a further embodiment of the invention, the first check-valve and/or the second check-valve and/or the over-pressure valve may be disposed in the control device. This not only provides a space-saving and simple construction but the position of the over-pressure valve also permits one to dispense with an additional container conduit.

Preferred examples of the invention will now be described in more detail with reference to the drawing, wherein.

Figure 1:
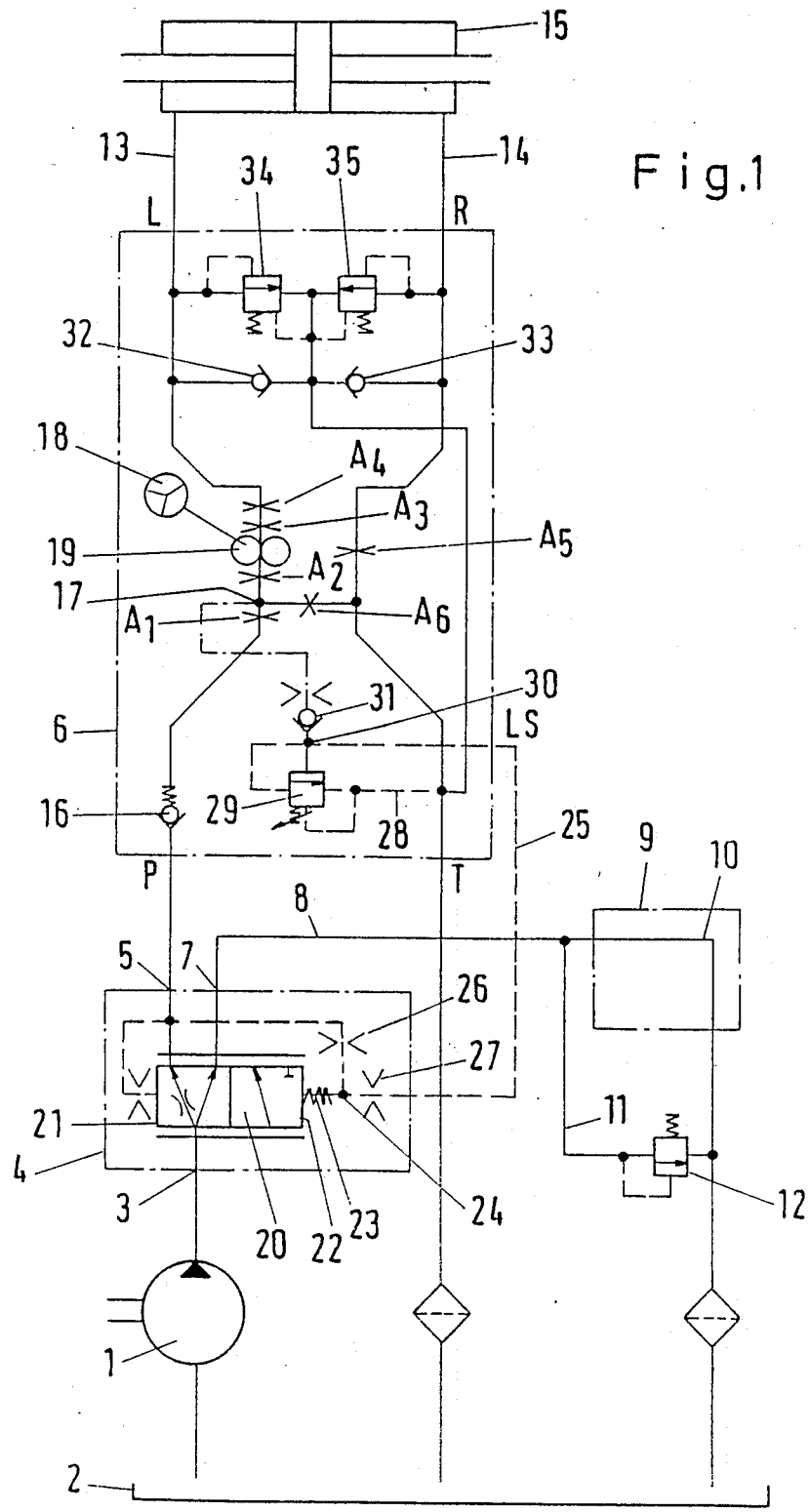
FIG. 1 is a circuit diagram of a steering device according to the invention.

In the FIG. 1 embodiment, a pump 1 feeds pressure fluid from a container 2 to the inlet 3 on the pump side of a priority valve 4. The outlet 5 of the latter is connected to the supply side inlet P of a control device 6 whereas the second outlet 7 of the priority valve 4 is connected to a consumer conduit 8. The latter leads to a consumer 9, for example a rotating motor or a piston-cylinder arrangement which, when not in operation, has a short circuit path leading to the container 2 and is bridged by a conduit 11 with an over-pressure valve 12. Apart from the connectIon P on the supply side, the control device has a connection T on the container side as well as two connections L and R on the motor side connected by way of a respective motor conduit 13 or 14 to a steering motor 15. Between the connection P on the supply side and one of the motor connections, there are provided in series a check-valve 16 opening towards the steering motor and four supply throttles A1, A2, A3 and A4. The other motor connection is connected to the container connection T by way of a return flow throttle A5. A further withdrawal throttle A6 is disposed between a junction 17 disposed between the first supply throttle A1 and the second supply throttle A2 and the connection T on the container side. In the neutral position, the throttles A1 to A5 are closed whilst the throttle A6 is open. If, during a steering operation, the throttles are displaced out of the neutral position, the throttle A6 will close first and, shortly before reaching the closed condition, the throttles A1 to A5 begin to open.

For steering purposes, there is a steering element 18 which adjusts the individual throttles A1 to A6. A flow meter 19 between the second supply throttle A2 and the third supply throttle A3 returns the throttles again depending on the flow.

The priority valve 4 comprises a slide 20 which is influenced at the end 21 by the pressure at the outlet 5 on the side of the control device whereas the opposite end 22 is biased on the one hand by the force of a spring and on the other hand by the pressure at a tapping 24 of a load pressure conduit 25. This load pressure conduit leads from the outlet 5 of the priority valve 4 on the side of the control device to the junction 17 in the control device 6. It comprises two pressure distributing throttles 26 and 27 between which there is a tapping 24. At a connection LS, the load pressure conduit 25 enters the control device 6 in which a relief conduit 28 with an over-pressure valve 29 extends between a branching off point 30 and the container connection T. A check-valve 31 opening towards the steering motor 15 is arranged in the load pressure conduit 25 between the branching off point 30 and the juntion 17.

Further, the control device 6 contains in known manner two supplementary suction valves 32 and 33 as well as two over-pressure valves 34 and 35 which each connect one of the motor conduits 13 or 14 to the container connection T.

The steering element 18 is adjustable in both directions of rotation. Depending on the direction, either the motor conduit 13 or the motor conduit 14 will serve as a supply conduit for the steering motor 15 The meter 19 always remains on the supply side.

If, during operation, the control device assumes the neutral position and for example the motor conduit 13 contains a higher pressure as a result of a force acting on the steering motor 15 from the outside, this higher pressure cannot be balanced out upon renewed steering by a return flow causing a kick-back at the steering element 18 because this is prevented by the check valve 16 in the supply conduit and by the check-valve 31 in the load pressure conduit 25. The same blocking effect also occurs when, as a result of a sudden pressure relief in the consumer conduit B, the pump pressure reduces and falls below the pressure at the junction 17.

Figure 2:
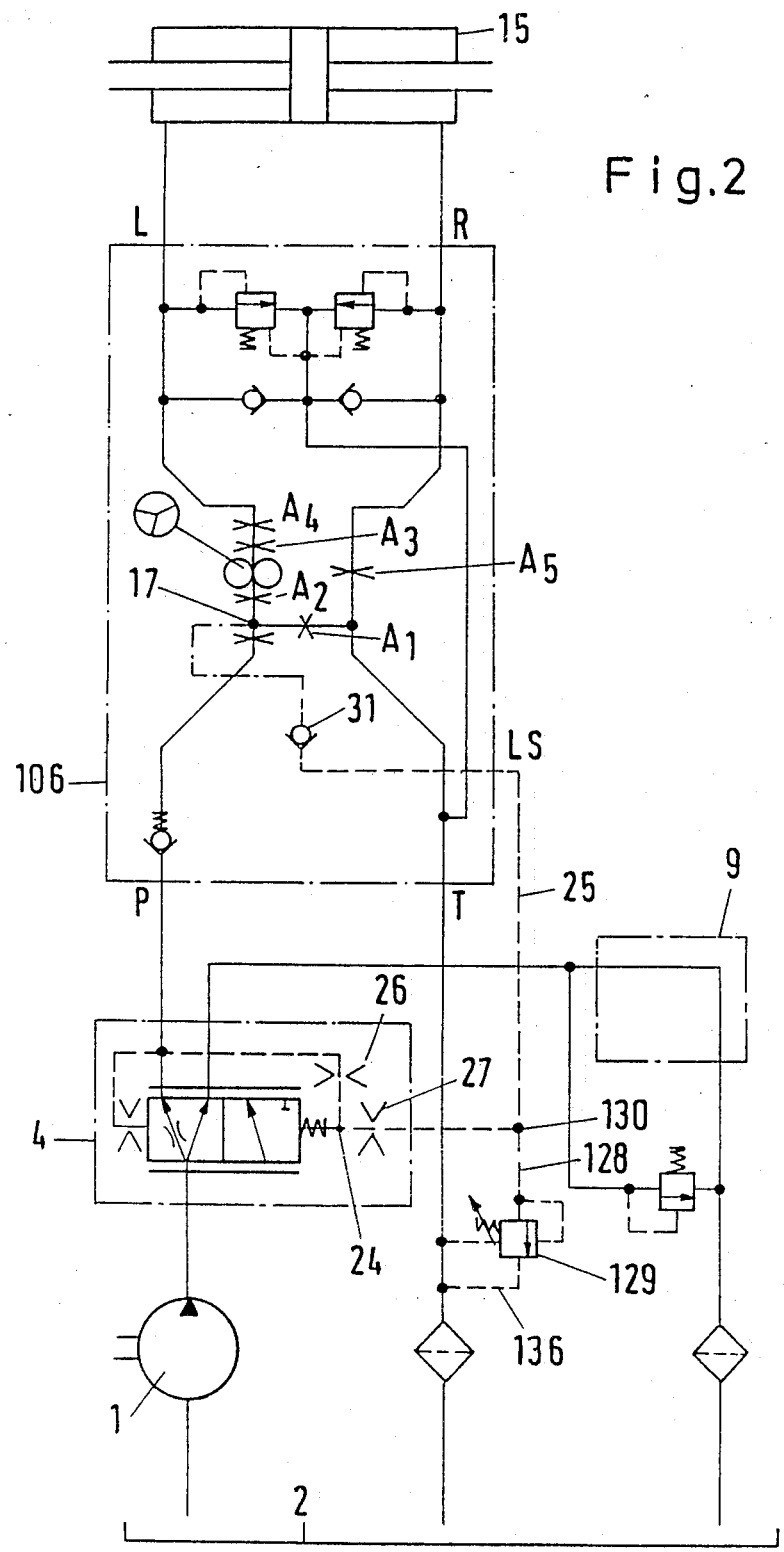
FIG. 2 is a modification thereof.

In the FIG. 2 embodiment, the same parts are given the same reference numerals and corresponding parts have reference numerals increased by 100. The principal difference is that the relief conduit 128 with the over-pressure valve 129 is disposed outside the control device 106 and an additional container conduit 136 must be provided.

What is claimed is:

1. A hydrostatic steering device that is controlled by a steering element for controlling the flow of pressurized fluid from the pressurized outlet port of a pump to a fluid steering motor having first and second ports and the return of fluid to a container, comprising a priority valve having first and second outlets, and a slide member movable in a first direction and a second direction, a tapping opening to the slide member for conducting fluid under pressure to urge the slide member to move in one of the first and second directions, a first fluid conduit fluidly connected to the first outlet of the priority valve, a control device for controlling fluid flow from the priority valve to the steering motor and from the steering motor to the container, the control device having a first junction, a first fluid connection, a second fluid connection fluidly connected to the steering motor first port, a third fluid connection fluidly connected to the steering motor second port, a first supply throttle, a flow meter, and a second supply throttle fluidly connected between the first junction and the meter, and a first check valve that opens toward the meter, is connected in series with the first supply throttle and is connected between the first junction and one of the first connection and the first conduit, first load means for providing a dynamic load pressure to operate the slide member between its positions, the first load means including a first pressure distributing throttle fluidly connected between the tapping and the first conduit, a second pressure distributing throttle fluidly connected to the tapping, and first conduit means fluidly connecting the second pressure distributing throttle to the first junction, the first conduit means including a second check valve that opens toward the first junction, second conduit means fluidly connected between the third connection and the container, the second conduit means including a return flow throttle and third conduit means fluidly connecting the return flow throttle to the container, and a withdrawal throttle fluidly connected to the first junction and to the second conduit means between the return throttle and the container, the withdrawal and return throttles forming a part of the control device, the withdrawal throttle having a neutral open position for conducting fluid from the first junction to the second conduit means, 2. A steering device according to claim 1 wherein the first check valve is located within the control device.

3. A steering device according to claim 1 wherein the second check valve is located within the control device.

4. A steering device according to claim 1 wherein the supply throttles, the return throttle and withdrawal throttles are operable from neutral positions to opened positions by the steering element, the supply throttles and return throttles being closed in their neutral positions and the withdrawal throttle being open in its neutral position.

5. A steering device according to claim 4 wherein there is provided a steering element, the control device includes a third supply throttle connected in series between the meter and the second connection and being operable by the steering element from a neutral closed position to open when the supply and withdrawal throttles open.

6. A hydrostatic steering device that is controlled by a steering element for controlling the flow of pressurized fluid from the pressurized outlet port of a pump to a fluid steering motor having first and second ports and the return of fluid to a container, comprising a priority valve having first and second outlets, and a slide member movable in a first direction and a second direction, a tapping opening to the slide member for conducting fluid under pressure to urge the slide member to move in fluidly connected to the first outlet of the priority valve, a control device for controlling fluid flow from the priority valve to the steering motor and from the steering to the container, the control device having a first junction, a first fluid connection, a second fluid connection fluidly connected to the steering motor first port, a third fluid connection fluidly connected to the steering motor second port, a first supply throttle, a flow meter, and a second supply throttle fluidly connected between the first junction and the meter, and a first check valve that opens toward the meter, is connected in series with the first supply throttle and is connected between the first junction and one of the first connection and the first conduit, first load means for providing a dynamic load pressure to operate the slide member between its positions, the first load means including a first pressure distributing throttle fluidly connected between the tapping and the first conduit, a second pressure distributing throttle fluidly connected to the tapping, and first conduit means fluidly connecting the second pressure distributing throttle to the first junction, the first conduit means including a second check valve that opens toward the first junction, second conduit means fluidly connected between the third connection and the container, the second conduit means including a return flow throttle, a withdrawal throttle fluidly connected to the first junction and to the second conduit means between the return throttle and the container, the withdrawal and return throttles forming a part of the control device, the withdrawal throttle having a neutral open position for conducting fluid from the first junction to the second conduit means, and a pressure relief valve fluidly connected to the first conduit means between the second check valve and the second pressure distributing throttle and to the second conduit means between the return throttle and the container.

7. A hydrostatic steering device that is controlled by a steering element for controlling the flow of pressurized fluid from the pressurized outlet port of a pump to a fluid steering motor having first and second ports and the return of fluid to a container, comprising a priority valve having first and second outlets, and a slide member movable in a first direction and a second direction, a tapping opening to the slide member for conducting fluid under pressure to urge the slide member to move in one the first and second directions, a first fluid conduit fluidly connected to the first outlet of the priority valve, a control device for controlling fluid flow from the priority valve to to the steering motor and from the steering motor, the control device having a first junction, a first fluid connection, a second fluid connection fluidly connected to the steering motor first port, a third fluid connection fluidly connected to the steering motor second port, a first supply throttle, a flow meter, and a second supply throttle fluidly connected between the first junction and the meter, and a first check valve that opens toward the meter, is connected in series with the first supply throttle and is connected between the first junction and one of the first connection and the first conduit, first load means for providing a dynamic load pressure to operate the slide member between its positions, the first load means including a first pressure distributing throttle fluidly connected between the tapping and the first conduit, a second pressure distributing throttle fluidly connected to the tapping, and first conduit means fluidly connecting the second pressure distributing throttle to the first junction, the first conduit means including a second check valve that opens toward the first junction, second conduit means fluidly connected between the third connection and the container, the second conduit means including return flow throttle, a withdrawal throttle fluidly connected to the first junction and to the second conduit means between the return throttle and the container, the withdrawal and return throttles forming a part of the control device, the withdrawal throttle having a neutral open position for conducting fluid from the first junction to the second conduit means, and a pressure relief valve, the first conduit means including a second junction between the second check valve and the container and first and second conduit portions connected to one another at the second junction, the pressure relief valve being fluidly connected between the second junction and the second pressure distributing throttle.

* * * * *